United States Patent
Cai

(10) Patent No.: US 10,635,454 B2
(45) Date of Patent: Apr. 28, 2020

(54) SERVICE MANAGEMENT METHOD AND THE DEVICE

(71) Applicant: ALIBABA GROUP HOLDING LIMITED, Grand Cayman (KY)

(72) Inventor: Ming Cai, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/661,099

(22) Filed: Jul. 27, 2017

(65) Prior Publication Data

US 2017/0322814 A1    Nov. 9, 2017

Related U.S. Application Data

(63) Continuation of application No. PCT/CN2016/072467, filed on Jan. 28, 2016.

(30) Foreign Application Priority Data

Feb. 3, 2015 (CN) .......................... 2015 1 0055949

(51) Int. Cl.
  *G06F 9/445* (2018.01)
  *G06F 9/50* (2006.01)
  *G06F 9/455* (2018.01)
  *H04L 29/08* (2006.01)

(52) U.S. Cl.
  CPC .......... *G06F 9/445* (2013.01); *G06F 9/45504* (2013.01); *G06F 9/5088* (2013.01); *H04L 67/16* (2013.01)

(58) Field of Classification Search
  CPC .................................. G06F 9/445; H04L 67/16
  See application file for complete search history.

(56) References Cited

U.S. PATENT DOCUMENTS

| | | |
|---|---|---|
| 7,299,468 B2 | 11/2007 | Casey et al. |
| 7,424,632 B2 | 9/2008 | Powers et al. |
| 7,607,129 B2 | 10/2009 | Rosu et al. |
| 8,180,871 B2 | 5/2012 | Brittenham et al. |
| 8,316,125 B2 | 11/2012 | DeHaan |

(Continued)

FOREIGN PATENT DOCUMENTS

| | | |
|---|---|---|
| CN | 1474269 A | 2/2004 |
| CN | 102279759 A | 12/2011 |

(Continued)

OTHER PUBLICATIONS

Holger Schmidt et al., "Adaptive Web Service Migration," 2008 [retrieved on Dec. 31, 2019], IFIP International Conference on Distributed Applications and Interoperable Systems, Distributed Applications and Interoperable Systems pp. 182-195, downloaded from <url>: https://link.springer.com, (Year: 2008).*

(Continued)

*Primary Examiner* — Thuy Dao
*Assistant Examiner* — Stephen D Berman

(57) ABSTRACT

The present invention provides a method and a device for service management, wherein the method comprises: detecting popularity of use of a remote target service by an application; and when the popularity reaches a first threshold value, loading the target service to the application locally. The present invention improves the response efficiency and adaptive capability of a distributed system.

18 Claims, 2 Drawing Sheets

(56) References Cited

U.S. PATENT DOCUMENTS

| | | | |
|---|---|---|---|
| 8,583,945 B2 | 11/2013 | Tran | |
| 8,589,557 B1 | 11/2013 | Labat et al. | |
| 8,627,123 B2 | 1/2014 | Jain et al. | |
| 8,751,844 B2 | 6/2014 | Mazzaferri et al. | |
| 8,862,744 B2 | 10/2014 | Garg et al. | |
| 8,868,749 B2* | 10/2014 | Bartfai-Walcott | G06F 9/445 709/226 |
| 8,892,779 B2 | 11/2014 | Winkler | |
| 8,935,692 B2 | 1/2015 | Ferris | |
| 9,032,396 B2 | 5/2015 | Nakashima et al. | |
| 2002/0178244 A1 | 11/2002 | Brittenham et al. | |
| 2003/0192028 A1* | 10/2003 | Gusler | G06F 9/4875 717/101 |
| 2004/0107291 A1 | 6/2004 | Gamo | |
| 2005/0102400 A1 | 5/2005 | Nakahara et al. | |
| 2008/0313660 A1* | 12/2008 | Malik | G06F 9/547 719/330 |
| 2009/0320023 A1* | 12/2009 | Barsness | G06F 9/5088 718/100 |
| 2009/0326970 A1 | 12/2009 | Estrada et al. | |
| 2010/0011352 A1* | 1/2010 | Chu | G06F 9/44526 717/174 |
| 2010/0125477 A1 | 5/2010 | Mousseau et al. | |
| 2010/0125665 A1 | 5/2010 | Simpson et al. | |
| 2010/0125844 A1 | 5/2010 | Mousseau et al. | |
| 2010/0192142 A1* | 7/2010 | Sun | G06F 9/445 717/168 |
| 2010/0250744 A1 | 9/2010 | Hadad et al. | |
| 2010/0251034 A1* | 9/2010 | Zhang | G06F 11/0709 714/48 |
| 2010/0325264 A1 | 12/2010 | Crowder | |
| 2011/0126192 A1* | 5/2011 | Frost | G06F 8/61 717/178 |
| 2011/0153715 A1* | 6/2011 | Oshins | G06F 9/5088 709/203 |
| 2011/0209145 A1 | 8/2011 | Chen et al. | |
| 2011/0307884 A1 | 12/2011 | Wabe et al. | |
| 2012/0005346 A1 | 1/2012 | Burckart et al. | |
| 2012/0151061 A1* | 6/2012 | Bartfai-Walcott | G06F 9/4856 709/226 |
| 2012/0222037 A1 | 8/2012 | Labat et al. | |
| 2012/0266168 A1 | 10/2012 | Spivak et al. | |
| 2012/0324443 A1* | 12/2012 | Low | G06F 9/45504 718/1 |
| 2013/0019015 A1* | 1/2013 | Devarakonda | G06F 9/5072 709/226 |
| 2013/0086577 A1 | 4/2013 | Nakashima et al. | |
| 2013/0097236 A1 | 4/2013 | Khorashadi | |
| 2013/0239109 A1 | 9/2013 | Ferwerda et al. | |
| 2013/0304899 A1 | 11/2013 | Winkler | |
| 2013/0311597 A1 | 11/2013 | Arrouye et al. | |
| 2013/0332917 A1* | 12/2013 | Gaither | G06F 8/67 717/170 |
| 2013/0339947 A1 | 12/2013 | Neary et al. | |
| 2014/0047429 A1* | 2/2014 | Gaither | G06F 8/60 717/170 |
| 2014/0237026 A1 | 8/2014 | Tang | |
| 2015/0052509 A1* | 2/2015 | Wang | G06F 9/44526 717/168 |
| 2015/0128033 A1* | 5/2015 | Li | G06F 17/30905 715/242 |
| 2016/0154664 A1* | 6/2016 | Iwamatsu | G06F 9/45558 718/1 |
| 2017/0177400 A1* | 6/2017 | Peng | G06F 9/445 |

FOREIGN PATENT DOCUMENTS

| | | |
|---|---|---|
| CN | 103473085 A | 12/2013 |
| CN | 103870470 A | 6/2014 |
| JP | 09-231148 A | 9/1997 |
| JP | 2000-215180 A | 8/2000 |
| JP | 2001-067325 A | 3/2001 |
| JP | 2003-022189 A | 1/2003 |
| JP | 2004-533687 A | 11/2004 |
| JP | 2005-141441 A | 6/2005 |
| JP | 2009-169473 A | 7/2009 |
| JP | 2011-258086 A | 12/2011 |
| JP | 2012-088797 A | 5/2012 |
| KR | 1020110038640 A | 4/2011 |
| KR | 20120016228 | 2/2012 |
| KR | 20140090208 | 7/2014 |
| KR | 1020150004913 A | 1/2015 |
| WO | 02/077798 A1 | 10/2002 |

OTHER PUBLICATIONS

P. Bellavista et al.,"The ubiquitous provisioning of internet services to portable devices," 2002 [retrieved on Dec. 31, 2019], IEEE Pervasive Computing,vol. 1, Issue 3, pp. 81-87, downloaded from <url>:https://ieeexplore.ieee.or (Year: 2002).*

Georgios Smaragdakis et al., "Distributed server migration for scalable internet service deployment," 2014 [retrieved on Dec. 31, 2019], IEEE/ACM Transactions on Networking, vol. 22, Issue 3, pp. 917-930, downloaded from <url>:https://ieeexplore.ieee.org. (Year : 2014).*

International Search Report and Written Opinion for International Application No. PCT/CN2016/082467, dated Apr. 14, 2016, 8 pages.

Korean Patent Application No. 10-2017-7024551, Notice to Submit Response dated Jun. 14, 2018.

Extended European Search Report dated Aug. 20, 2018, issued in European Application No. 16746097.1 (7 pages).

PCT International Preliminary Report on Patentability dated Aug. 17, 2017, issued in International Application No. PCT/CN2016/072467 (7 pages).

Yuan-ni Liu et al., "Service migration in service-oriented future Internet", *Application Research of Computers*, vol. 31, No. 12, Dec. 2014 (pp. 3828-3832).

First Office Action dated Aug. 15, 2018, issued in related Chinese Application No. 201510055949.6 (10 pages).

Search Report dated Sep. 28, 2018, issued in related Japanese Application No. 2017-558606 (26 pages).

Notification of Reasons for Refusal dated Oct. 23, 2018, issued in related Japanese Application No. 2017-558606 (6 pages).

Second Office Action for Chinese Application No. 201510055949.6 dated Mar. 12, 2019 with English machine translation (8 pages).

Notice of Allowance for Korean Application No. 10-2017-7024551 dated Apr. 25, 2019 (3 pages).

Office Action for related Korean Patent Application No. 10-2017-7024551, dated Nov. 26, 2018, 7 pages.

Examination Report for European Application No. 16746097.1 dated Nov. 25, 2019 (4 pages).

* cited by examiner

SERVICE MANAGEMENT METHOD AND THE DEVICE

CROSS-REFERENCE TO RELATED APPLICATIONS

This application is a continuation application of International Application No. PCT/CN2016/072467, filed on Jan. 28, 2016, which claims priority to and benefits of Chinese Patent Application No. 201510055949.6 filed on Feb. 3, 2015. The contents of the above-referenced applications are incorporated herein by reference in their entirety.

TECHNICAL FIELD

The present application relates to the field of network technologies, and in particular to a method and a device for service management.

BACKGROUND

A distributed system refers to a computer system including a plurality of interconnected processing resources, which implement the same task in a collaborative way as controlled by the entire system. The implementation of a task may involve different service units in a plurality of application systems, and information interaction is carried out among these different service units mostly through remote invocation or calling. However, remote invocation will result in significant time consumption, and when a distributed system grows to a certain scale, this part of consumption will severely lower response efficiency of the system. According to relevant technologies, to save time consumed by remote invocation, an application analysis may be conducted and application systems having a relationship of service dependence can be deployed in a physically concentrated manner; however, such approach has relatively poor flexibility and adaptability, and analysis and deployment need to be performed again when there are changes to the applications, which increases the cost and affects the performance of services.

SUMMARY

In light of the above, the present application provides a method and a device for service management, so as to improve the response efficiency and adaptive capability of a distributed system.

According to an aspect of the present disclosure, a method for service management is provided. The method includes detecting popularity of use of a remote target service by an application, when the popularity reaches a first threshold value, loading the target service to be local with the application.

According to another aspect of the present disclosure, a device for service management is provided. The device includes a popularity detection module configured to detect popularity of use of a remote target service by an application, and a migration control module configured to, when the popularity detection module detects that the popularity reaches a first threshold value, load the target service to be local with the application.

According to a further aspect of the present disclosure, a non-transitory computer-readable storage media storing instructions is provided. The instructions, when executed by a processor, cause the processor to perform a method comprising detecting popularity of use of a remote target service by an application, and when the popularity reaches a first threshold value, loading the target service to be local with the application.

With the method and the device for service management according to the present application, when the popularity of a service reaches a preset threshold value, the service is downloaded to be local with the application, which improves the response efficiency and adaptive capability of a distributed system relative to remote invocation.

DETAILED DESCRIPTION OF THE EMBODIMENTS

Figure 1:
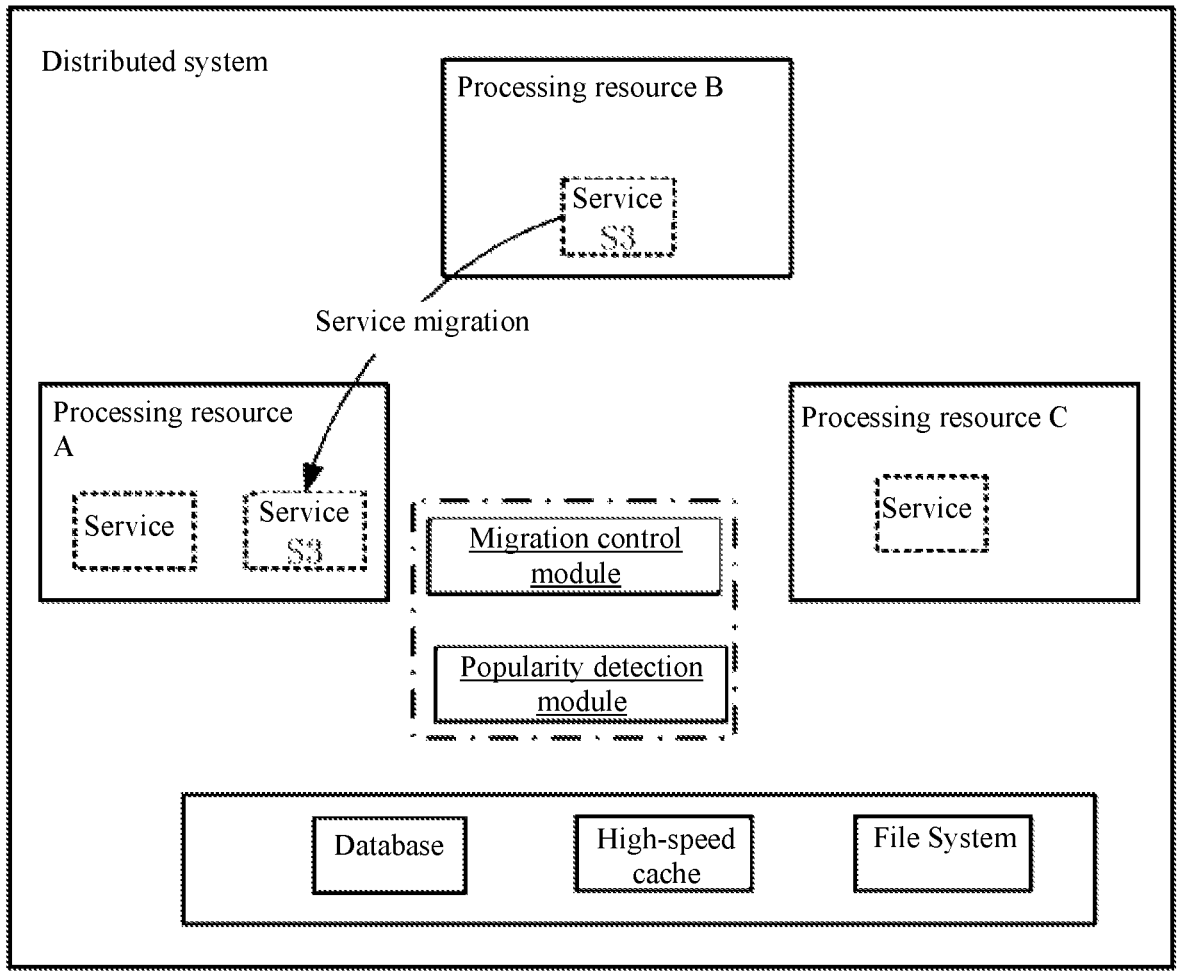
FIG. 1 illustrates a distributed system architecture according to an embodiment of the present application.

FIG. 1 illustrates a distributed system architecture, according to some embodiments of the present disclosure. The system comprises a plurality of processing resources, which may be, for example, a data storage server, a JAVA virtual machine, etc. Various application system services and data are distributed in the above processing resources. Several concepts used in the method for service management according to the embodiments of the present disclosure will be briefly described as follows.

Service and application: using a user opening an account at a bank as an example (it should be noted that this application is only an example), it is assumed that three steps are required for the entire account-opening process: 1. Verifying the user's I.D. information; 2. Verifying whether there are records of bad credit; 3. Setting up new account information. Then, each of "verifying I.D. information", "verifying credit records" and "setting up new account information" may be referred to as a "service"; the service of "verifying I.D. information" may probably be provided by an "application" system of a public security agency, while the services of "verifying credit records" and "setting up new account information" are provided by an application system of the bank. The application system can include a software application, a hardware system (e.g., a computer, a smart phone, a tablet, a server, etc.), or a combination of a software application and a hardware system (a hardware system has the software application stored thereon, and can run the software application). With respect to the account opening request by the user, it can be simply described that an application system of the bank accepts the request and then invokes, remotely, the service provided by an application system of the public security agency to perform the first step of verification; subsequently, the second step and the third step are invoked locally to ultimately complete the entire account opening process. According to this solution, we can simply interpret "application" as a way to divide services and deployments of services, one application may provide one or more services to a user or other applications. In the process to implement a user request, the service dependence among application systems is referred to as "an application using service" or "an application invoking service" in the present application.

Service accessing a data source: in a logic implementation process of a service, it typically involves data access; for example, the verifying I.D. information in the above example uses an I.D. database that stores the I.D. information, querying the database with the I.D. to be verified. The process involves the access to the data source, the "I.D. database", by the service, "verifying I.D. information". The service can be performed normally only when the data access is normal. As shown in FIG. 1, the data source may be from a database "Data Source", a file system "File System", or a high-speed cache "Cache".

Local service and remote service: regarding local and remote, the two concepts may be interpreted in terms of their physical meanings, namely a service invoked by an application is a remote service when the service is not on the same resource, e.g., a server, where the application is deployed, otherwise it is a local service; in the above example, if the application system of the bank is deployed on a processing resource A, while the application system of the public security agency is deployed on a processing resource B, then the service, "verifying I.D. information", will be a remote service for the application system of the bank, and the other two services are local services as they can be run on the application system of the bank. In other words, when the application system of the bank invokes the service, "setting up new account information", the service logic is deployed on the processing resource A and can be directly invoked and executed on the resource A, making it a local service. On the other hand, the public security application system to which the invoked service, "verifying I.D. information", belongs is deployed on another processing resource B, and consequently the application system of the bank needs to send, via a network, a service invocation request to the application on the processing resource B and wait for the return of the execution result by the service, "verifying I.D. information", which is a remote service invocation.

Remote service invocations will result in time consumption for network transmission and waiting. When an application frequently invokes a remote service, in particular, the execution efficiency of the application will be significantly affected; the method for service management in the embodiments of the present application will be used to improve the response efficiency of a distributed system and reduce the time consumption of service invocation. In a conventional way, moreover, it is necessary to manually analyze services on a critical service pathway and services to be depended on, to deploy the application systems, in which these services are located physically nearby. As a result, the requirements for service analysis personnel are relatively high, and the complexity is increased for the deployment, operation, and maintenance of the entire system; when the critical service pathway changes or the dependence relationship changes, re-deployment is required, which will affect the service stability. Moreover, it is very inflexible and has poor adaptability. The method for service management in the embodiments of the present disclosure will further improve the adaptive capability of a distributed system to flexibly adapt to service invocation by applications. Relative to physically nearby deployment, moreover, the embodiments lowers the granularity of migration of services, which will be favorable for lowering the equipment cost.

Figure 2:
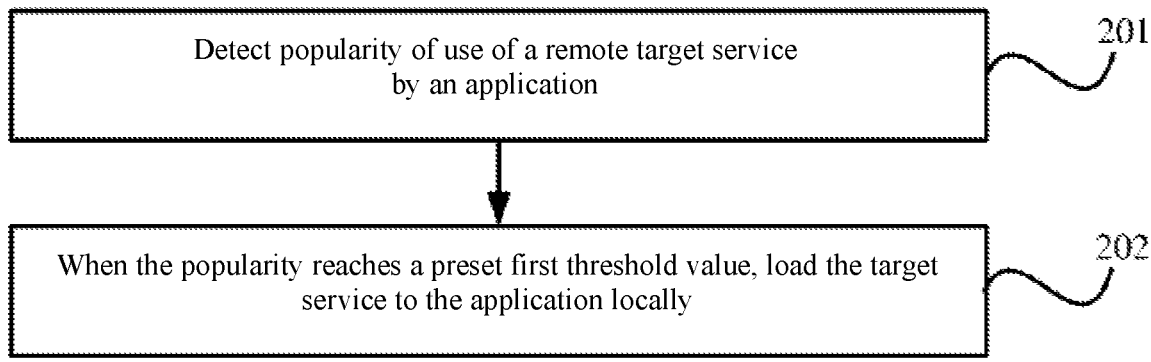
FIG. 2 is a flow chart of a method for service management according to an embodiment of the present application.

As shown in FIG. 1, the present application, according to some embodiments, adds a device for service management in the distributed system. In some embodiments, the device includes a popularity detection module and a migration control module. The device for service management can execute the flow of the method for service management shown in FIG. 2. As shown in FIG. 2, the method may include:

201. Detecting popularity of use of a remote target service by an application.

For example, in this step, it could be that the popularity detection module detects popularity of use of a remote target service by an application. It should be noted that the device for service management can be considered as a global management device, which can summarize and record a lot of information in an actual implementation. Table 1 below illustratively lists some optional record information:

TABLE 1

| | | | | | | | |
|---|---|---|---|---|---|---|---|
| | | | | | | Loading version (loading | |
| | | | First (loading) | Second (unloading) | Can it | situation of | |
| | Service | Popularity | threshold | threshold | be | device in this | |
| Application | used | of use | value | value | loaded | application | Remarks |
| Y1 | S3 | 682 | 500 | 200 | Yes | {192.168.10.1: loaded 1.0; 192.168.10.2: not loaded} | |
| Y1 | S5 | 2315 | 2000 | 1000 | No | | Local data source does not meet requirements |
| Y2 | S1 | 282 | 100 | 10 | No | | Service does not support migration |
| Y2 | S2 | 150 | 200 | 100 | No | | Invocation popularity is not enough |

TABLE 2

Services information

| Service | Application to which it belongs | Can it be migrated | Dependence description (Dependence description of data sources, memory resources, CPU, etc.) | Current version |
|---|---|---|---|---|
| S1 | Y1 | No | None | 1.0 |
| S2 | Y1 | Yes | None | 1.1 |
| S3 | Y2 | Yes | None | 1.0 |
| S5 | Y2 | Yes | {MySQL: "192.168.12.1: 3306"; Memcache: "192.168.13.1: 12001"} | 1.6 |

The information in Table 1 above is explained as follows: application and service have been described above and will not be described in detail again. The execution of a service may be dependent on a plurality of services for assistance. The method for service management in the embodiments of the present disclosure involves service migration, but not every service can be migrated.

Migration of services: with reference to the example in FIG. 1, the application Y1 on the processing resource A needs to use the service S3, while the logic, e.g., program code for providing the service, of the service S3 is stored on the processing resource B. If the application Y1 invokes the service S3 on the processing resource B, it is a remote invocation of the service. In some embodiments, the service S3 may be migrated from the processing resource B to the processing resource A. The migration refers to the migration of the service logic. As mentioned above, the execution of a service may probably involve the access to a data source. A complete execution of a service may include two parts, "logic" and "data". The service migration in the embodiments of the present disclosure refers to the migration of the logic, i.e., a copy of a segment of the logic of a target service being migrated. Namely, the logic of the service S3 is copied at processing resource B and the copy is stored on the processing resource A. Consequently, the logic flow of the service S3 may be executed locally at the processing resource A. In addition, it should be noted that the service S3 belongs to Y2 and is merely used by Y1. Even if migration (migration is a process of copying the service logic, and a copy of the service logic is migrated) takes place, the service S3 still belongs to Y2.

Migratable service: as mentioned above, the migration of a service refers to the migration of logic only, i.e. the logic of the processing flow defined by the service. The migration of a service to an application (migrated to the processing resource where the application is installed) often requires that the application can access resources on which normal execution of the service is dependent. For example, the normal execution of the service S5 needs to access a data source (MySQL and Memcache), but the application Y1 cannot access that data source. Then, the service S5 cannot be executed normally after the service S5 is migrated to the application Y1, and the service S5 is not migratable with respect to the application Y1.

For a service to be a migratable service with respect to an application, the application needs to be able to access a data source needed by the service. In some other embodiments, other conditions may be imposed. For example, a migratable service often is an independent service with a clear logic boundary and does not have complex mutual dependence with other services, and moreover, the service may be complete and has a small size, such that it can be easily migrated. It may be further required that the service is a stateless service with no state of mutual dependence. All these are to make a service easy to be migrated. Furthermore, whether the accessibility of a service is affected after the service is migrated to an application could be taken into account. For example, a service has high efficiency when accessing a data source before migration, but the execution efficiency of the service becomes lower, due to various reasons after the migration, to such a degree that the service requirement of the application is no longer met. As a result, the service would be deemed not suitable for migration. Furthermore, it should be noted that a migratable service is usually a remote service to an application, as migration is not necessary for local services.

A distributed system may comprise many applications. The device for service management can globally manage what services are migratable to what applications, manage data sources that each application can access, and unify the names of the data sources to facilitate determining whether an application comprises a data source required by a service. In addition, the device for service management can further summarize information like the popularity of use of a migratable service by applications, whether the service has been loaded to an application, and whether the service has been updated.

Popularity of use of a migratable service by applications: the "popularity" is mainly used to indicate the frequency of use of the service by applications. For example, the service is invoked by an application 50 times within one hour; certainly, what type of metric is specifically used to indicate the popularity may be flexibly determined according to actual situation. In some embodiments, a first threshold value and a second threshold value may be set for the popularity, and the first threshold value is greater than the second threshold value. The first threshold value is mainly used to indicate, when the popularity value reaches or is higher than the threshold value, that the use of the service by the application is very frequent and has reached the tolerance limit at which the execution efficiency of the application is affected. When the popularity reaches the first threshold value, service migration could be performed, namely, the service is loaded to the application. The second threshold value is mainly used to indicate, when the popularity value reaches or is lower than the threshold value, that the application currently rarely uses the service, and service unloading may be performed to save processing resources.

Furthermore, to avoid frequent loading and unloading, an intermediate value may be set between the first threshold value and the second threshold value. For example, the first threshold value is 100 times, the second threshold value is 20 times, and an intermediate value of 80 times is set between these two threshold values. Such a practice will prevent overly frequent loading or unloading of the service that may cause the system unstable.

Loading of a service to an application: the loading of a service to an application refers to that a remote service has been migrated to an application locally. For example, as shown in FIG. 1, the service S3 in the processing resource B is migrated to the processing resource A where the application Y1 is located, which indicates that the service S3 has been loaded to the application Y1.

Service update: the logic of a service in a distributed system may produce, for example, different versions of the service; the device for service management in the present embodiment may monitor whether a service has been updated; furthermore, to reduce the resource consumption by the device for service management, it may only monitor remote services that have been loaded to applications. That is because the goal of monitoring service update is as follows: if a service loaded to an application has been updated, then the current service on the application is an old version that cannot be used, and it is necessary to promptly unload the old version and re-load the new version. Thus, the device for service management may only monitor the state of services that have been loaded to applications.

Figure 3:
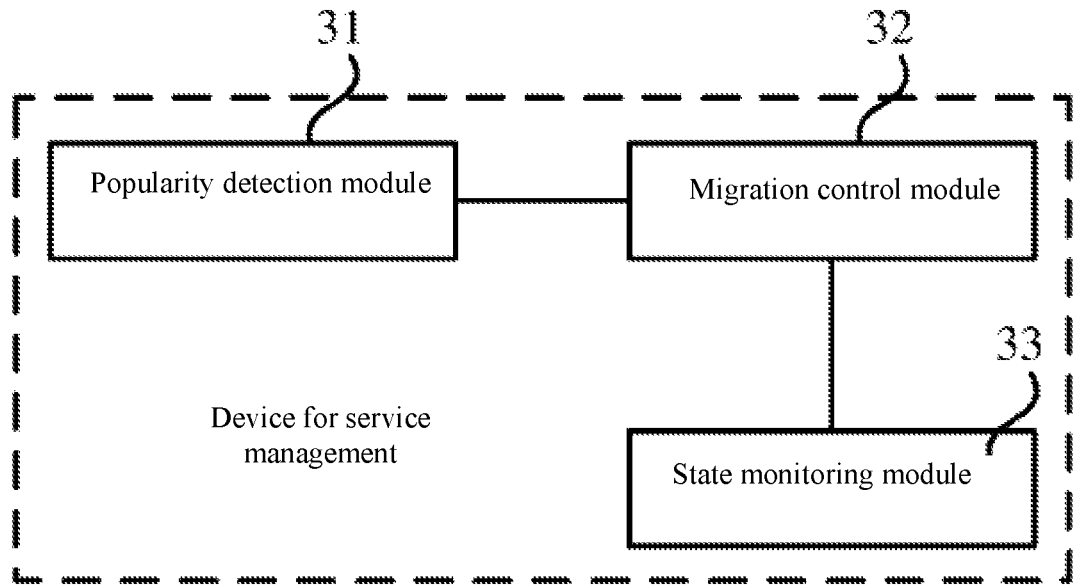
FIG. 3 illustrates a structural diagram of a device for service management according to an embodiment of the present application.

In a specific implementation, a state monitoring module may be added to the device for service management for monitoring whether a target service loaded to an application has been updated. Referring to FIG. 3, in such a case, the device for service management may comprise: a popularity detection module 31, a migration control module 32, and a state monitoring module 33.

In this step, the popularity detection module 31 of the device for service management will detect popularity of use of a remote target service by an application, and specifically, monitor popularity of use of a remote service by each application, and proceed to 202 according to the detected popularity.

202. When the popularity reaches a preset first threshold value, loading the target service to be local with the application.

For example, in this step, when the popularity detection module 31 detects that the popularity of use of the target service by the application reaches a preset first threshold value, the migration control module 32 loads the target service to be local with the application. Optionally, it is assumed that the popularity of use of the service S3 on the processing resource B by the application Y1 on the processing resource A has reached the first threshold value, and then the migration control module 32 can migrate the service S3 from the processing resource B to the processing resource A. Moreover, the migration control module 32 may be located on the processing resource A, or may be a module dedicated to loading or unloading remote services. For example, two modules may be provided on the processing resource A, one of which is a module dedicated to managing local services, and the other one is a module dedicated to loading or unloading remote services (e.g. the remote class loader on the JAVA virtual machine JVM). Such arrangement makes it easier to manage remote services. When there is a need to load or unload a remote service, the migration control module 32 just needs to be notified by the popularity detection module 31.

In addition, the loading or unloading of services in the embodiments of the present disclosure may be performed asynchronously with the application. For example, an application is currently in the process of remote invocation of a service, but it has been detected that the popularity of use of the service by the application reaches the first threshold value. Then, the migration control module performs migration of the service, but the migration does not affect the current execution by the application. The application is still in the remote service invocation mode at this time, and will only use the service loaded locally in the next execution by the application.

Furthermore, as mentioned above, the popularity detection module continues detection of the popularity of use of the target service by the application after the target service has been loaded to the application locally. If it is detected that the popularity reaches the second threshold value, namely the application subsequently has a relatively low frequency of use of the target service, the migration control module may unload the target service from the application locally, so as to save the processing resources.

Furthermore, after the target service has been loaded to the application locally, the state monitoring module 33 of the device for service management may notify the migration control module upon detection of an update to the target service, such that the migration control module unloads the target service on the application locally, and loads the updated target service.

Figure 4:
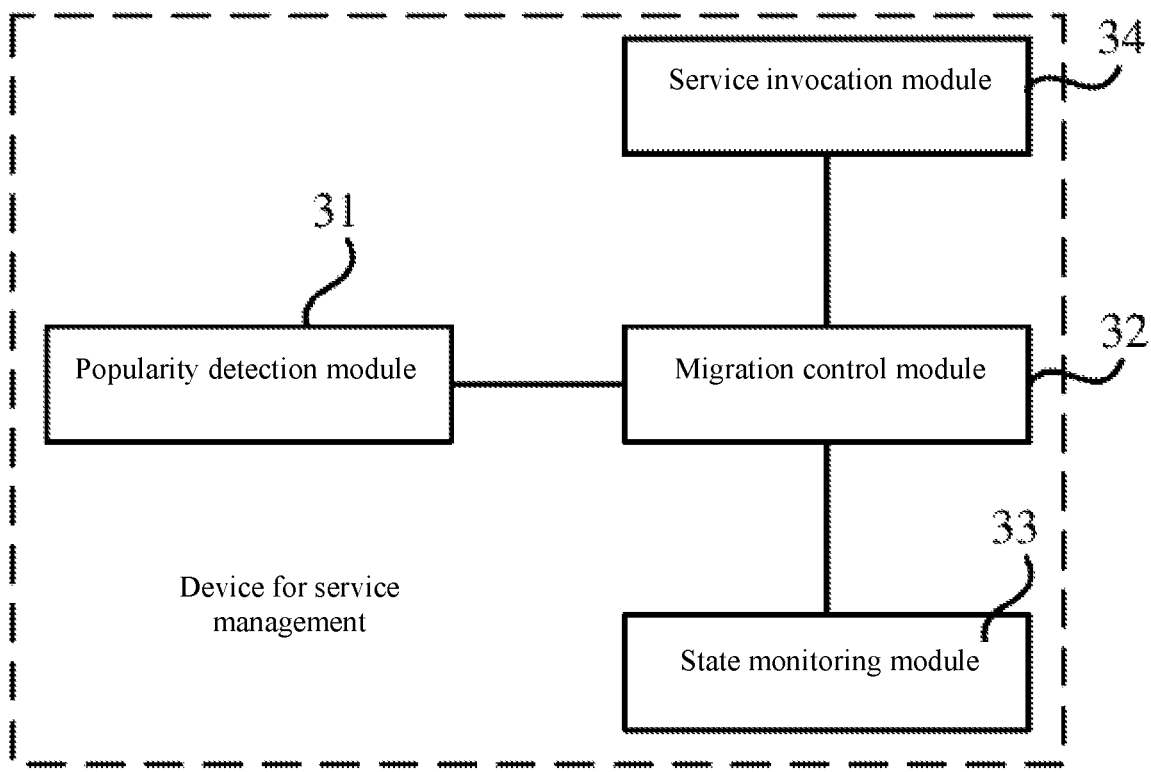
FIG. 4 illustrates a structural diagram of another device for service management according to an embodiment of the present application.

After a remote service has been loaded to the application locally, the device for service management may further comprise a service invocation module 34. As shown in FIG. 4, when used to execute an application, the service invocation module 34 determines whether the application locally stores the loaded target service; if the determination result is that the target service is stored locally, it is preferable to use the local target service to execute the application to reduce time consumption by remote invocation; if the determination result is that the target service is not stored locally, regular remote invocation is used.

It can be seen from the embodiment above that, by adding a device for service management into a distributed system, the device can implement the method for service management in the embodiment above. When the popularity of use of a remote target service by an application reaches a frequency threshold value, the remote service is migrated to the application locally. Compared to conventional ways, such arrangement allows the device for service management to automatically determine the use frequency of a service and perform automatic service migration, which saves the cost for manual analysis and deployment, and improves the service deployment efficiency. Such arrangement of automatic service determination and migration has higher flexibility and can quickly adapt to the actual situation of application execution. By migrating a remote service to an application locally, it also avoids the time consumption by remote invocation and improves the response efficiency of the distributed system. In addition, the method in the present embodiment uses service as the granularity of analysis, which achieves more precise migration granularity and further improves the processing efficiency relative to the conventional centralized deployment with an application granularity.

All the embodiments in this specification are described in a progressive manner, each embodiment focuses on the differences from the other embodiments, and reference may be made to each other for the same or similar parts of the embodiments.

Relational terms such as first and second herein are merely used for distinguishing an entity or operation from another entity or operation, and do not necessarily require or imply that these entities or operations have any of such real relationships or orders. Besides, the terms "include", "contain" or any other variations are intended to cover non-exclusive inclusions, so as to cause a process, method, commodity or device including a series of elements to not only include those elements, but also include other elements that are not listed specifically, or also include elements that are inherent in this process, method, commodity or device.

A person skilled in the art can understand that, various exemplary logic blocks, units, modules, circuits, and algorithm steps described herein may be implemented as specialized electronic hardware, computer software, or a combination of electronic hardware and computer software. For examples, the steps and modules/units may be performed or implemented by one or more processors executing software instructions stored in the computer-readable storage medium to perform the specialized functions of the steps and modules/units.

The flowcharts and block diagrams in the accompanying drawings show system architectures, functions, and operations of possible implementations of the system and method according to multiple embodiments of the present invention. Each block in the flowchart or block diagram may represent one module/unit, one program segment, or a part of code, where the module/unit, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

Embodiments of the present disclosure may take the form of a computer program product embodied in one or more tangible and/or non-transitory computer-readable storage media containing computer-readable instructions (e.g., program codes). The computer-readable instructions, when executed by one or more processors, cause the one or more processors to implement the steps and units/modules disclosed in the disclosure. The computer-readable storage medium may include volatile or non-volatile, magnetic, semiconductor, optical, removable, non-removable, or other types of computer-readable storage medium or computer-readable storage devices. Common forms of non-transitory computer-readable storage medium include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The computer-readable instructions may also be loaded onto a computer device (for example, a personal computer (PC), a server, a mobile device (e.g., smart phone), or a tablet device) and when the computer device executes the computer-readable instructions, for example, by one or more processors of the computer device, the computer device performs a series of operational steps/functions to implement the methods, functions, and units/modules illustrated and described in the flow diagrams and/or the block diagrams in this disclosure. In a typical configuration, a computer device includes one or more processors, an input/output interface, a network interface, and a memory. The memory may include any form of storage medium as discussed above. The memory can store the computer-readable instructions that can be executed by the processor in the computer.

Persons skilled in the art can implement or use the present application according to the description of the disclosed embodiments. It is apparent to persons skilled in the art that various modifications can be made to these embodiments, and general principles defined in this specification may be implemented in other embodiments without departing from the spirit or scope of the present application. Therefore, the present application is not limited by the embodiments described herein, but has the broadest scope conforming to the principles and innovative features disclosed by this specification.

The invention claimed is:

1. A method for service management, comprising:
   invoking, by a first application in a first device, a remote target service stored on a second device and associated with a second application in the second device, wherein the remote target service is provided by the second device through a network to the first device;
   detecting, by the first device, popularity of use of the remote target service by the first application, wherein the popularity of use of the remote target service comprises a frequency of use of the remote target service by the first application;
   determining, by the first device, that the remote target service meets a plurality of migration conditions, wherein the migration conditions comprise:
      that the first device locally comprises a data source required by the remote target service,
      that the remote target service is an independent service that does not have mutual dependence with any other service on the second device, and
      that the remote target service is a stateless service; and
   when the popularity reaches a first threshold value, loading, by the first device, a copy of the remote target service to the first device to be local with the first application, wherein:
      the determining that the remote target service meets a plurality of migration conditions is requisite for the loading,
      the loading comprises loading a copy of a segment of a logic component of the remote target service and excludes loading a data component of the remote target service, and
      the remote target service remains available on the second device and local with the second application after the loading.

2. The method of claim 1, wherein, after the loading the copy of the remote target service to be local with the first application, the method further comprises:
   unloading, by the first device, the copy of the remote target service from being local with the first application when the popularity reaches a second threshold value.

3. The method of claim 1, wherein, after the loading the copy of the remote target service to be local with the first application, the method further comprises:
   unloading, by the first device, the copy of the remote target service from being local with the first application when it is determined that the remote target service is updated.

4. The method of claim 1, wherein, after the loading the copy of the remote target service to be local with the first application, the method further comprises:

when executing the first application, determining, by the first device, whether the first application has the copy of the remote target service locally; and if the determination result is that the copy of the remote target service is local, using, by the first device, the copy of the remote target service to execute the first application.

5. The method of claim 1, wherein the use of the remote target service requires accessing a remote data source by the first application before and after the loading the copy of the remote target service to be local with the first application.

6. The method of claim 1, wherein the data source required by the remote target service is implemented separately from the first application on the first device.

7. A first device for service management, comprising one or more processors and one or more non-transitory computer-readable memories coupled to the one or more processors and configured with instructions executable by the one or more processors to cause the first device to perform operations comprising:

invoking, by a first application in the first device, a remote target service stored on a second device and associated with a second application in the second device, wherein the remote target service is provided by the second device through a network to the first device;

detecting popularity of use of the remote target service by the first application, wherein the popularity of use of the remote target service comprises a frequency of use of the remote target service by the first application;

determining that the remote target service meets a plurality of migration conditions, wherein the migration conditions comprise:

that the first device locally comprises a data source required by the remote target service, that the remote target service is an independent service that does not have mutual dependence with any other service on the second device, and that the remote target service is a stateless service; and when the popularity reaches a first threshold value, loading a copy of the remote target service to the first device to be local with the first application, wherein:

the determining that the remote target service meets a plurality of migration conditions is requisite for the loading, the loading comprises loading a copy of a segment of a logic component of the remote target service and excludes loading a data component of the remote target service, and the remote target service remains available on the second device and local with the second application after the loading.

8. The device of claim 7, wherein the operations further comprise:

unloading the remote target service from being local with the first application when the popularity reaches a second threshold value.

9. The device of claim 7, wherein the operations further comprise:

monitoring updates to the remote target service; and unloading the copy of the remote target service from being local with the first application when it is determined that the remote target service is updated.

10. The device of claim 7, wherein the operations further comprise:

determining, when executing the first application, whether the first application has the copy of the remote target service locally; and if the determination result is that the copy of the remote target service is local, use the copy of the remote target service to execute the first application.

11. The device of claim 7, wherein the use of the remote target service requires accessing a remote data source by the first application before and after the loading the copy of the remote target service to be local with the first application.

12. The device of claim 7, wherein the data source required by the remote target service is implemented separately from the first application on the first device.

13. A non-transitory computer-readable storage medium storing instructions that, when executed by a processor of a first device, cause the processor to perform operations comprising:

invoking, by a first application in the first device, a remote target service stored on a second device and associated with a second application in the second device, wherein the remote target service is provided by the second device through a network to the first device;

detecting popularity of use of the remote target service by the first application, wherein the popularity of use of the remote target service comprises a frequency of use of the remote target service by the first application;

determining that the remote target service meets a plurality of migration conditions, wherein the migration conditions comprise:

that the first device locally comprises a data source required by the remote target service, that the remote target service is an independent service that does not have mutual dependence with any other service on the second device, and that the remote target service is a stateless service; and when the popularity reaches a first threshold value, loading a copy of the remote target service to the first device to be local with the first application, wherein:

the determining that the remote target service meets a plurality of migration conditions is requisite for the loading, the loading comprises loading a copy of a segment of a logic component of the remote target service and excludes loading a data component of the remote target service, and the remote target service remains available on the second device and local with the second application after the loading.

14. The non-transitory computer-readable storage medium of claim 13, wherein, after the loading the copy of the remote target service to be local with the first application, the operations further comprise:

unloading the copy of the remote target service from being local with the first application when the popularity reaches a second threshold value.

15. The non-transitory computer-readable storage medium of claim 13, wherein, after the loading the copy of the remote target service to be local with the first application, the operations further comprise:

unloading the copy of the remote target service from being local with the first application when it is determined that the remote target service is updated.

16. The non-transitory computer-readable storage medium of claim 13, wherein, after the loading the copy of the remote target service to be local with the first application, the operations further comprise:

when executing the first application, determining whether the first application has the copy of the remote target service locally;

if the determination result is that the copy of the remote target service is local, using the copy of the remote target service to execute the first application.

17. The non-transitory computer-readable storage medium of claim 13, wherein the use of the remote target service requires accessing a remote data source by the first application before and after the loading the copy of the remote target service to be local with the first application.

18. The non-transitory computer-readable storage medium of claim 13, wherein the data source required by the remote target service is implemented separately from the first application on the first device.

\* \* \* \* \*